US010817351B1

(12) United States Patent
Soura et al.

(10) Patent No.: US 10,817,351 B1
(45) Date of Patent: Oct. 27, 2020

(54) METHOD AND APPARATUS FOR HYBRID SERVICE EVENT

(71) Applicant: Blend Labs, Inc., San Francisco, CA (US)

(72) Inventors: Keith Soura, New York, NY (US); Gabriel Szczepanek, New York, NY (US)

(73) Assignee: Blend Labs, Inc., San Francisco, CA (US)

( * ) Notice: Subject to any disclaimer, the term of this patent is extended or adjusted under 35 U.S.C. 154(b) by 0 days.

(21) Appl. No.: 16/510,637

(22) Filed: Jul. 12, 2019

Related U.S. Application Data

(60) Provisional application No. 62/697,954, filed on Jul. 13, 2018.

(51) Int. Cl.
*G06F 9/54* (2006.01)
*G06F 9/445* (2018.01)
*G06F 9/48* (2006.01)

(52) U.S. Cl.
CPC .......... *G06F 9/542* (2013.01); *G06F 9/44521* (2013.01); *G06F 9/4843* (2013.01)

(58) Field of Classification Search
CPC .......... G06F 9/542; G06F 9/44; G06F 9/4843; G06F 9/44521
See application file for complete search history.

(56) References Cited

U.S. PATENT DOCUMENTS

| | | | |
|---|---|---|---|
| 7,072,800 B1 * | 7/2006 | Fernandez | G06F 11/3414 702/186 |
| 8,855,469 B2 | 10/2014 | Maharajh | |
| 2002/0049736 A1 * | 4/2002 | Chow | G06Q 30/06 |
| 2003/0012183 A1 * | 1/2003 | Butler | H04L 12/6418 370/352 |
| 2003/0028578 A1 * | 2/2003 | Jain | G06F 9/5066 718/100 |
| 2003/0093402 A1 | 5/2003 | Upton | |
| 2003/0120628 A1 * | 6/2003 | Salo | G06F 9/4493 |
| 2009/0171974 A1 | 7/2009 | Arthursson | |

(Continued)

OTHER PUBLICATIONS

Written Opinion PCT/US2019/041815.

*Primary Examiner* — Tuan C Dao
(74) *Attorney, Agent, or Firm* — Foundation Law Group LLP; JD Harriman

(57) ABSTRACT

The system provides an event driven system that sits between the enterprise ecosystem and the client system. The system creates a bridge between systems that produce actionable information and systems that consume events related to that information. It coordinates data-change events between those internal microservices for the client, providing a simple, well-typed interface for change events that may drive downstream actions in a consuming service. In one embodiment, the system can intercept those messages, decorate them with client-specific configuration data, and send them to the appropriate downstream client systems, all the while tracking the state of events to provide an auditable window into the system. Events are designed to help an appropriately credentialed and authorized consuming system dynamically call the enterprise's API resources in post-processing by providing relative linking as an out-of-the-box attribute of the event messages.

7 Claims, 7 Drawing Sheets

(56) References Cited

U.S. PATENT DOCUMENTS

| | | | |
|---|---|---|---|
| 2013/0073509 A1* | 3/2013 | Burkard | G06N 5/048 |
| | | | 706/52 |
| 2013/0080641 A1* | 3/2013 | Lui | H04L 43/045 |
| | | | 709/226 |
| 2013/0204894 A1 | 8/2013 | Faith | |
| 2013/0219176 A1 | 8/2013 | Akella | |
| 2014/0380290 A1 | 12/2014 | Auerbach et al. | |
| 2015/0207871 A1* | 7/2015 | Li | H04L 41/0604 |
| | | | 709/223 |
| 2015/0248461 A1* | 9/2015 | Theeten | G06F 16/24568 |
| | | | 707/718 |
| 2016/0036716 A1* | 2/2016 | Pal | H04L 67/2804 |
| | | | 709/207 |
| 2019/0182119 A1* | 6/2019 | Ratkovic | H04L 43/045 |

\* cited by examiner

METHOD AND APPARATUS FOR HYBRID SERVICE EVENT

This patent application claims priority to U.S. Provisional Patent Application 62/697,954 filed on Jul. 13, 2018, which is incorporated by reference herein in its entirety.

BACKGROUND OF THE SYSTEM

There is often a need to provide integration between an enterprise and a client computer system. In some cases, this is referred to as Application Programming Interface (API) convergence, or API integration because of the need to interact with different APIs. To provide a new program or utility in such situations requires that the different programs be able to communicate with each other seamlessly, managing different data formats, databases, and other metrics and features so that both sides can have a useful result.

Estimates suggest that there are over 15,000 APIs in existence. Integration is required because of the lack of standardization in software, data formats, and technical sophistication in various industries (e.g. consumer finance and consumer finance adjacent verticals). It is possible to integrate two or more APIs by dedicating programming efforts to the integration, but such techniques typically only work for those specific APIs and are therefore not scalable. There have been attempts to provide API convergence products. There are third party APIs that might be a solution to a particular combination of enterprise and client APIs, but such a one-size-fits-all approach may not have the feature set required for the particular solution being implemented. Often these current systems lack auditability, control, and security measures required for enterprise-grade systems. Another disadvantage of these systems is their requirement of specific client-side platforms and hardware, lack of customizability (requiring heavy consultant use) and expense. In addition, for particular client APIs, no integration tool or product may exist, so no solution is possible unless the tool maker decides to provide it.

Instead, many enterprises are forced to build an API convergence from scratch, which is expensive, time consuming, and doesn't scale. In addition, for an enterprise that seeks to interact with a large number of clients, there is a requirement for large engineering teams, where each engineer and/or team may be an expert in their own deployment vertical. This also creates a risk for the enterprise if the expert engineer leaves the enterprise. Such an approach is not sustainable.

SUMMARY

The system provides an event driven system that sits between the enterprise ecosystem and the client system. The system creates a bridge between systems that produce actionable information and systems that consume events related to that information. It coordinates data-change events between those internal microservices for the client, providing a simple, well-typed interface for change events that may drive downstream actions in a consuming service. In one embodiment, the system can intercept those messages, decorate them with client-specific configuration data, and send them to the appropriate downstream client systems, all the while tracking the state of events to provide an auditable window into the system. The system can work in concert with the enterprise API. Events are designed to help an appropriately credentialed and authorized consuming system dynamically call the enterprise's API resources in post-processing by providing relative linking as an out-of-the-box attribute of the event messages. Combining these two systems enables external clients to react in near-real time to activities on the enterprise platform.

DETAILED DESCRIPTION OF THE SYSTEM

The system utilizes a framework comprised of many small primitive integration points that can be composed with minimal work and minimal retesting (since functional composition assures that if 'f' and 'g' are both well tested, f(g( )) will also be well tested in certain strict situations which can be enforced). This allows the system to provide a menu of possible integrations to clients and partners with proven performance metrics and quickly create gap analyses and avoid incurring unnecessary short-term engineering costs as well as long term maintenance costs.

Figure 3:
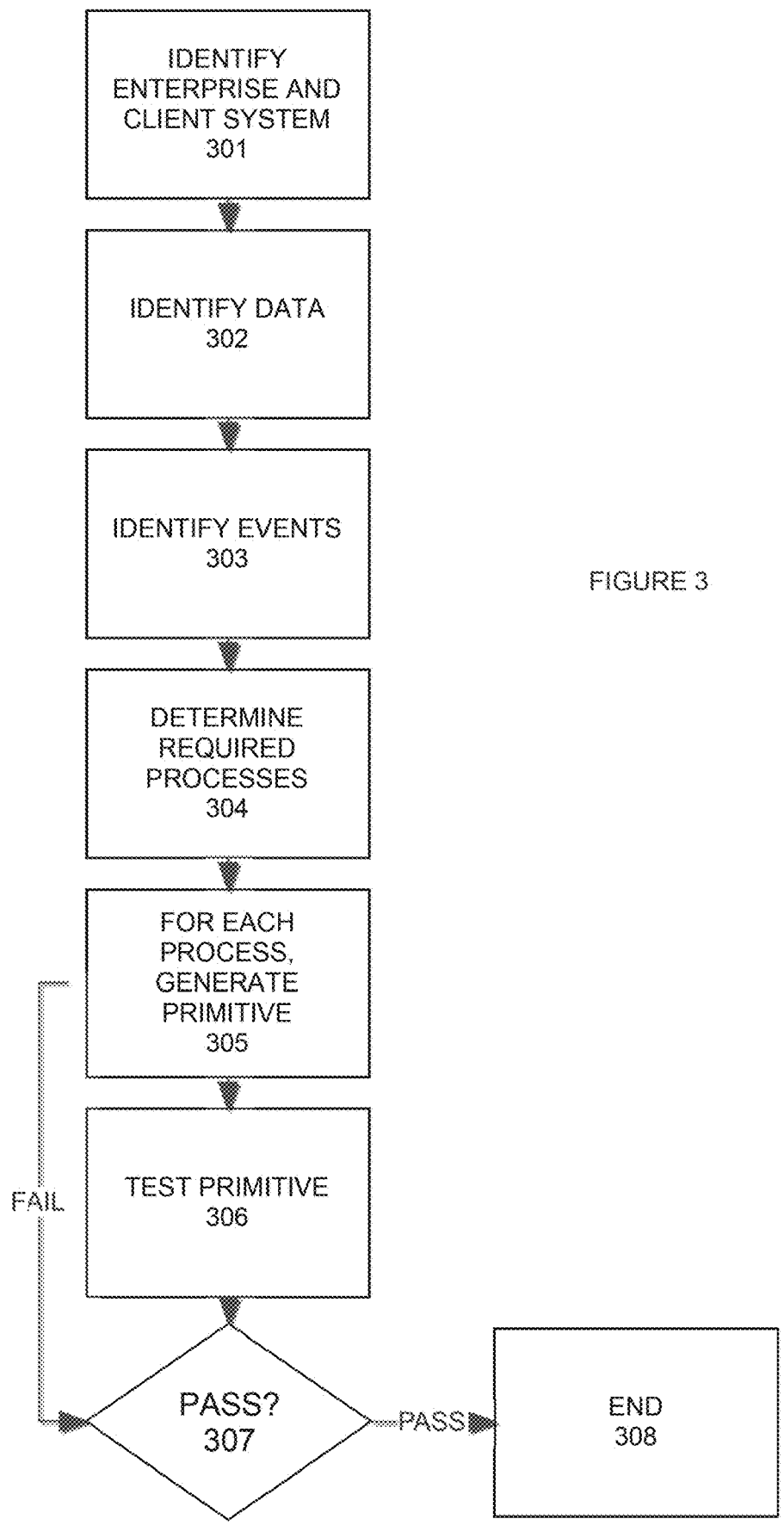
FIG. 3 is a flow diagram illustrating the generation of primitives in an embodiment of the system.

FIG. 3 is a flow diagram illustrating the generation of primitives in an embodiment of the system. At step 301 the user (e.g. developer) identifies the enterprise and client systems to be integrated. At step 302 the user identifies the data that will be produced by each system. At step 303 the user defines the events that will be generated by each system. At step 304 the user determines the processes required by the applications to be performed between the client and the enterprise. At step 305, for each defined process, the user generates a primitive function.

At step 306 the user tests the primitive. At decision block 307 it is determined if the primitive function has passed. If not, the system returns to step 305 and modifies or generates a new primitive function for that process. If the primitive passes, the process ends at step 308.

In one embodiment, many primitives will already exist for the system, and the user can simply select from known and tested primitives for use in the integration. This speeds up and simplifies the integration process.

The system provides a method and apparatus for an event driven system to provide a bridge between an enterprise system and a client system. The system is language and hardware agnostic, providing flexibility and the ability to be used with nearly any client configuration. The input and output of the system are messages, so that any platform that is capable of sending and receiving data in any format can take advantage of the system.

Current solutions often rely on "chaining" requiring a linear progression or flow of data from module to module with defined module boundaries. By contrast, the present system uses graph theory and function theory so that it can natively support non-linear data flow in various graph shapes and function composition.

Primitives

The system utilizes the concept of primitives, which are quanta of work packaged in functions that are generic enough to be re-used in many integration recipes (e.g. the concept of credentialed access is nearly universal and can be re-used again and again and, when composed with other functions, can be easily extended). In this way, rather than requiring heavy-weight modules for integrations, the system allows a large number of possible integrations by composing light-weight, well-tested, well-understood primitives into new recipes that can be re-used and changed dynamically in the future at low cost.

In one embodiment, the system includes the following primitives: S/FTP; Encrypt/Decrypt; Generic HTTP/Consumer; Generic HTTP/Producer; Map; Validator, and Persistence. S/FTP is used to upload or download a file or set of files to or from an S/FTP server using various authentication methods. The S/FTP primitive is sometimes chained with a mapping primitive The Encrypt/Decrypt primitive is used to encrypt or decrypt a payload using some scheme or protocol (e.g. PGP). In one embodiment this primitive is implemented with a public key encryption scheme. This primitive is often chained with S/FTP or Generic HTTP/Producer.

Generic HTTP/Consumer is a listener module capable of generating an authenticated or un-authenticated inbound requests. This primitive is sometimes chained with Encrypt/Decrypt and/or the Map primitive. Generic HTTP/Producer is a primitive capable of generating an authenticated or un-authenticated outbound HTTP request given a specific target system, request schema, and input. This primitive is often chained with Map and/or Encrypt/Decrypt.

Map is a transform primitive that takes an input and a mapping function (often from the Persistence primitive) and produces an output. This is a function with some persistent store that allows it to apply a mapping function that transforms some input data of any arity into some output data of any arity as defined in the map itself. This function is chainable and also composable (meaning that sets of mapping functions may be composed to produce a desired outcome). The Map primitive is often chained with the Validator primitive, Generic HTTP/Consumer, Generic HTTP/Producer; and S/FTP primitives.

Validator is a primitive that, given a schema and an input, verifies that the input matches requirements and is capable of returning a difference of the input to the ideal. The Persistence primitive, given some data and a backend configuration, stores data in a persisted medium. This interface accepts data and a configuration and writes to the data store indicated in the configuration (so long as it has the proper connectors). Examples of connectors include AWS S3, Redis, Postgres, Mongo, and the like.

The system also uses the notion of events to help provide the scalable integration. Every change to the state of an application is captured as an event object. The Event Objects are stored with sequence metadata so that an accurate event log can be generated and used to reconstruct past states. The log can be used as a foundation to automatically adjust the state to cope with retroactive changes. Metadata can be added to Event Objects to aid in downstream processing and make integration more efficient.

One embodiment of the system is such that all changes to the integration system are initiated by Event Objects. This means that the application state can be rebuilt by re-running events from the event log. It also permits reversing incorrect event results and system states by rerunning the events up to a particular time or event. The same ability allows the system to handle asynchronous events.

Although the system state can be generated at any time by re-running Event Objects, maintaining accurate system states avoids the need for complete re-running, and can be done from known points of the system state as desired.

The Event Objects can be used with the primitive functions to provide the processing and logic bridge between the enterprise and client systems. This leads to a scalable integration system that can be re-used more easily with multiple systems.

Multiple Levels of Integration, Many-to-Many Linking

As opposed to the existing market solutions, which focus on integrating sub-services, the present system is also capable of integrating both sub-services and integrations services themselves on equal footing. For example, the system is capable of linking convergence products such as Websphere and TIBCO together across organizations as well as linking two traditional web servers via API. While traditional solutions focus on a 1:1 integration pattern (one input system with one downstream consequence), the present system is capable of handling a 1:many or many:many pattern, acting as a message router between multiple systems and coordinating many downstream consequences.

Figure 1:
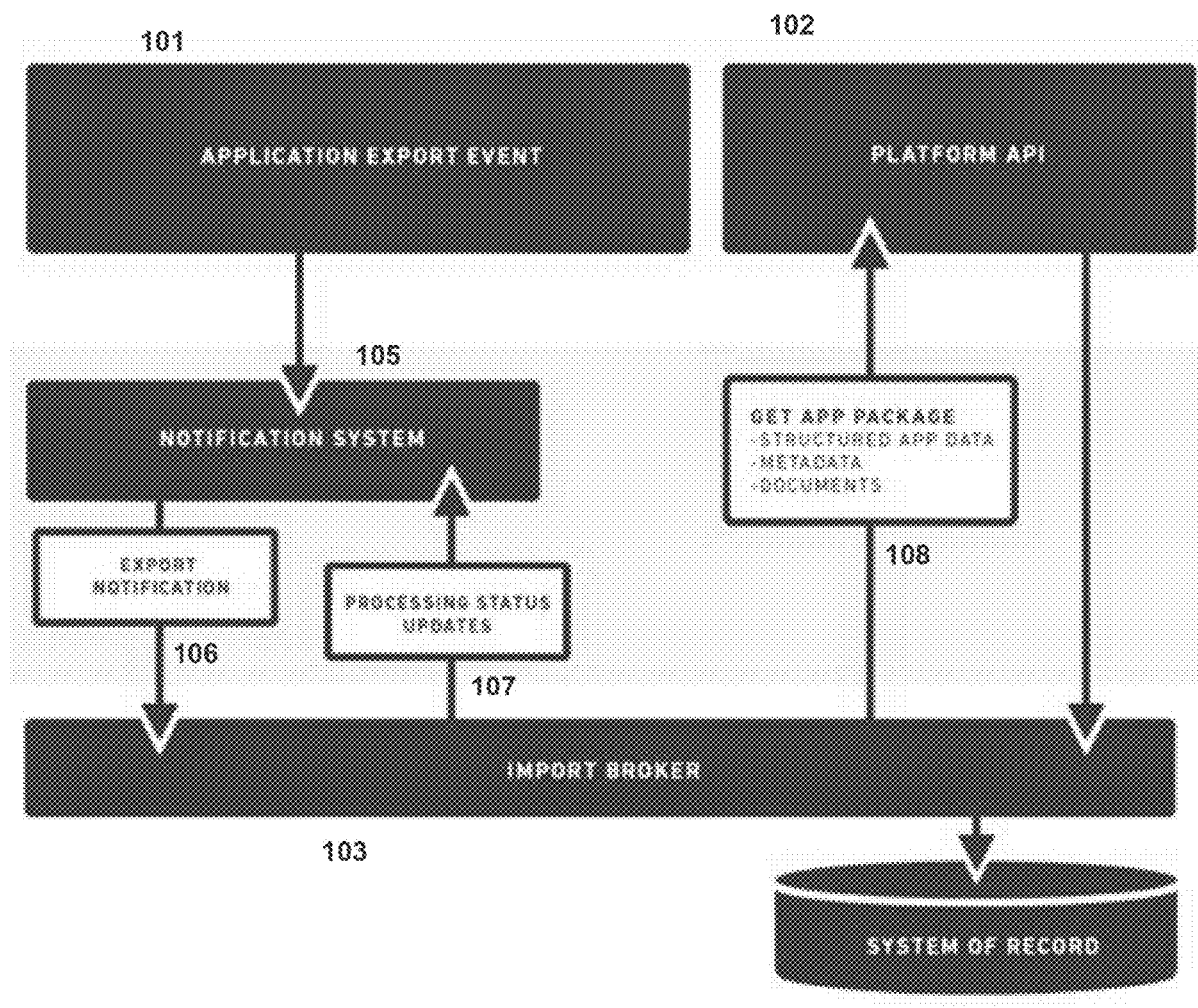
FIG. 1 is a block diagram of an embodiment of the system.

FIG. 1 is a block diagram illustrating an embodiment of the system. The embodiment comprises an enterprise portion, bridge portion, and client portion. The enterprise portion comprises Application Export Event 101 and Platform API 102. The client portion comprises Import Broker 103 and System of Record 104. The bridge portion comprises Notification System 105, Export Notification 106, Processing Status Updates 107, and Get App Package 108.

The Platform API 102 communicates with the client side Import Broker 103 via the bridge portion and via the Get App Package 108. The Get App Package 108 includes Structured App Data, Metadata, and Documents from the client to the enterprise side Platform API 102. At the enterprise portion, events are communicated to the Notification System 105 from the Application Export Event block 101. The Notification System 105 provides Export Notification 106 to the Import Broker 103 and receives Processing Status Updates 107 from the client side via Import Broker 103.

The primitives of the system, e.g. database- or code-backed configuration objects, contain information about four areas including event routing, event shape, event dispatch, and event management and recovery. These areas are described in more detail in connection with FIG. 2.

Figure 2:
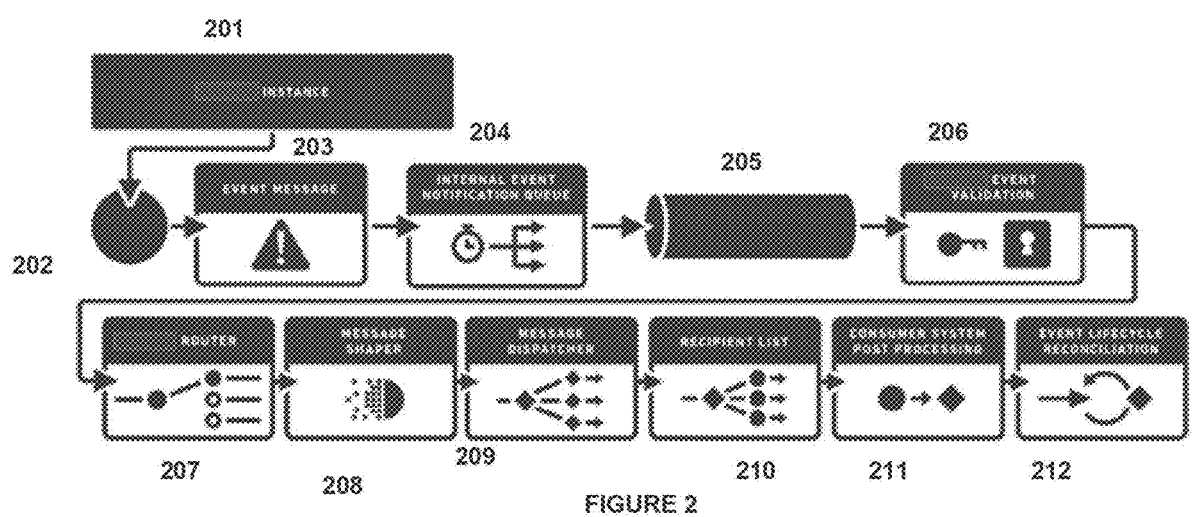
FIG. 2 is a block diagram of an embodiment of the notification system 105 of FIG. 1.

FIG. 2 is an embodiment of the bridge between the enterprise and the client using system.

Event Routing—It's not enough to simply persist an event, the system should understand from where the event originated to understand where it needs to go next. The system manages origination information with naming conventions that are centrally managed. When an Event is sent to the system, it already contains all the background information needed to make future routing decisions, because of the naming convention. The system retrieves any pre-processing steps for event formation from the event routing directives (where does the system send the event when it's ready, how does the system authenticate, and how does the system record the state of an event using the context of the configuration (e.g. success, failure, retry, etc.) to denote that state and flow control are also configurable and are not simply static values in the system?) in the routing layer before passing the decorated context and inbound event to the pre-processor.

The naming convention is such that internally the event is routed by a [producerSystemId, subscriptionId, environment] tuple. The subscription is a compound object that joins a [consumerSystemId, channelId, tenantId, overrideData] tuple. (In one embodiment of the system, the rules of traversing the edges of the graph from node to node are defined by the subscription itself). Channels represent routes on a root system URI (this allows a single system to host multiple event consumers with distinct requirements). Tenants represent a consistent context passed between systems internally to describe who is involved in an event stream. The above is transmitted with requests via a UUID in the header or externally to listeners outside the system ecosystem using a [tenant, profile] tuple where each is represented as a string.

This manifests in external requests as headers of the form 'system-event-profile: someProfileName' and 'system-target-instance: someTargetInstanceName' where both attributes have a unique constraint within the universe of system data. In one embodiment of the system the header keys are also customizable and can represent transformations on the HTTP request primitive (consumer and/or producer) as leveraged by the Message Dispatcher 209.

The enterprise instance 201 receives an Event and processes it at 202 to generate an Event Message 203. The Event Message 203 includes all of the Event Routing information described above, or at least a subset sufficient for routing correctly. The Event Message 203 is provided to an Internal Event Notification Queue 204 where it is scheduled for transfer to the client side. The Event Message, via 205, moves to Event Validation Module 206 and then to Event Router 207. The system now proceeds to Event Shape.

Event Shape—The Message Shaper 208 receives the decorated context from the router 207. The system then builds the outbound event object that will be shared with client systems. The Message Shaper 208 uses the primitives defined by the system to shape the Event Message appropriately. The recipe for constructing the object using the primitives is built into the configuration context provided by the router 207. The core event structure is well-defined and typed: the system defines a few basic attributes that must exist for every event (e.g., a contextually unique identifier, timestamps, primary object reference information, and the like).

The system also allows for the addition of a metadata sub-object that may contain information specific to a particular subscriber or message type to allow for flexibility in message content across a wide range of potential consumers/clients. Each configuration contains self-validation information, which is used to validate the finished object before it is passed to the Dispatcher to be sent to the subscribing event consumers.

Event Dispatch—The Message Dispatcher 209 receives an instance of an Event, along with the requisite routing configuration context, from the Message Shaper 206. Events represent a class of objects comprising actionable events corresponding to certain data changes in the system. In the example of a loan process, an Event may be a borrower submitting and application, consent is granted, a loan related document is available, and the like.

For increased security, routing configuration contains encrypted information about where to find the necessary secret values required for authorization to external systems. A secondary system handles retrieving, using, and destroying secret information when requests are eventually dispatched. After the request is properly built and the Event object translated into the output format of the consuming system, the Event is sent via Recipient List 210 to the proper set of subscribers within the context of the originating system's routing configuration and presented to the client system 211 for post-processing. Depending on the synchronous or asynchronous nature of the event passed from the router (also part of the routing directives), the system's persistent representation of the Event's state will be updated.

Event Management and Recovery—Events have a state diagram that permits only certain transitions. Interpreting those states and enforcing their transition rules is the job of the Manager. The system simultaneously supports synchronous and asynchronous operation based on event-client configuration pairs. In the first case (synchronous operation), the Event's state is transitioned immediately upon receipt of response data from the Dispatcher's external systems request. In the second case, the system must curate the behavior of mid-process asynchronous Events. After a message is dispatched, it may be immediately transitioned to the ACKNOWLEDGED or FAILED state at the Event Lifecycle Reconciliation Module 212, depending on the synchronous ACK of the external system. For acknowledged events, the system will hold the Event open as it waits for confirmation that external downstream processing has begun or that, again, there has been a failure. In the positive case, the system will wait for confirmation from the external consumer that processing has completed (e.g. an Event and all its downstream actions have been successfully completed)—again with the option of SUCCEEDED or FAILED. If things do not go as planned at any point, the Event may be selected for retry by the Manager. Once retries are exhausted, the Event will be in an unrecoverable state, causing its inclusion in various monitoring dashboards and reports for investigation.

Task Graphs for Asynchronous Events

Many of the system integration tasks are asynchronous in nature. In one embodiment, an inbound event is mapped to a single consequence within a tenant/instance context; that is, the origin node of the task graph has one downstream node. In one embodiment, the system will allow for events to dynamically generate instances of pre-configured task graphs (sequences of integration tasks with certain completion dependencies). This allows the system to be able to quickly and easily provide clients with even more comprehensive and complex integration services, while not increasing time to launch or maintenance costs.

Figure 4:
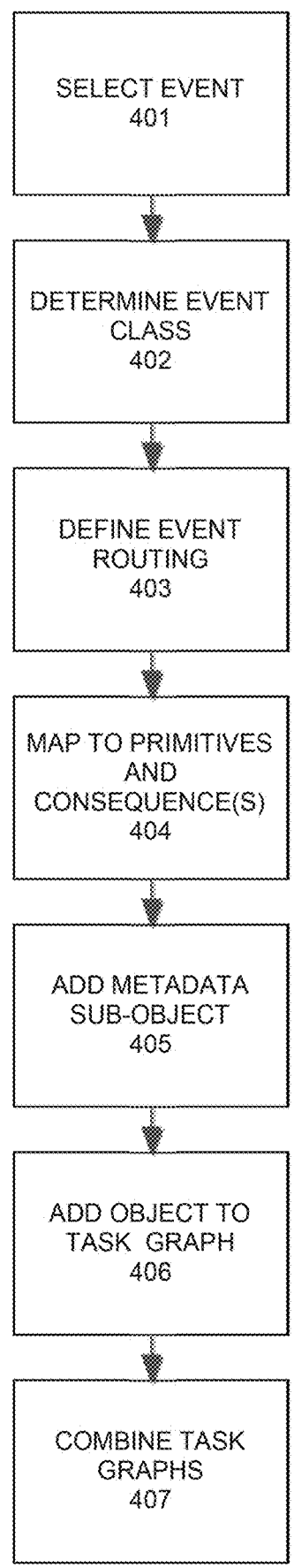
FIG. 4 is a flow diagram illustrating the generation of an integration application in an embodiment of the system.

FIG. 4 is a flow diagram illustrating the generation of an integration application in an embodiment of the system. In one embodiment this is referred to as building a task graph. At step 401 the user selects an Event. At step 402 the user determines the class of the Event. (Each event in one embodiment is categorized into one or more classes). Based on the class of the Event, the system defines the Routing information for the Event at step 403. This includes the information noted above with respect to Event Routing.

At step 404 the Event is mapped to appropriate primitives and consequences. This step of composing primitives allows the system to provide a menu of possible integrations to clients and partners with proven performance metrics and quickly create gap analyses and avoid incurring unnecessary short-term engineering costs as well as long term maintenance costs. This step handles how functions are combined and applied using the rules in a configuration map. In one embodiment the map has a section that includes a set of Events that are valid. For example, an event producer may produce many events but a consumer may only be interested in a subset of those events (e.g. valid events). Within each valid Event are configurations that describe any customizations that need to occur to those Events from their standard form to be able to be used by a particular consumer. For example, a customer may have a special field needed to tie together there data to system data that is not part of the base configuration. This section will include that information. This action provides a composition engine to map the Event to a primitive.

The map also has a function library that includes custom functions that are used to process that particular subscription. Within that function library are components that might be used for the formatting a field. Consider for example, application submit flow, where application data in the system model must be translated into the data model of the receiver or in a message format that the receiver can understand. Those functions take different system data parts and includes instructions in the configuration as to how to obtain the data or format the data that already exists in the messages that get passed.

In one embodiment those functions can be composed together in a contextual configuration and be used to compose primitives.

At step 405 a metadata sub-object is added to the Event Object. This metadata can aid in downstream processing and make integration more efficient. At step 406 the Event Object is added to a task graph. This is a collection of events that can define linear or non-linear data flow based on dependencies. At step 407 task graphs can be combined to define the integration process for the system.

Because the system uses defined event objects and well tested and simple primitives, the operation of an integrated system is simpler and more reliable than with prior art systems. All security and qualifying information can be included, without depending on limited definitions provided by out of the box solutions.

Task Graphs

Figure 6:
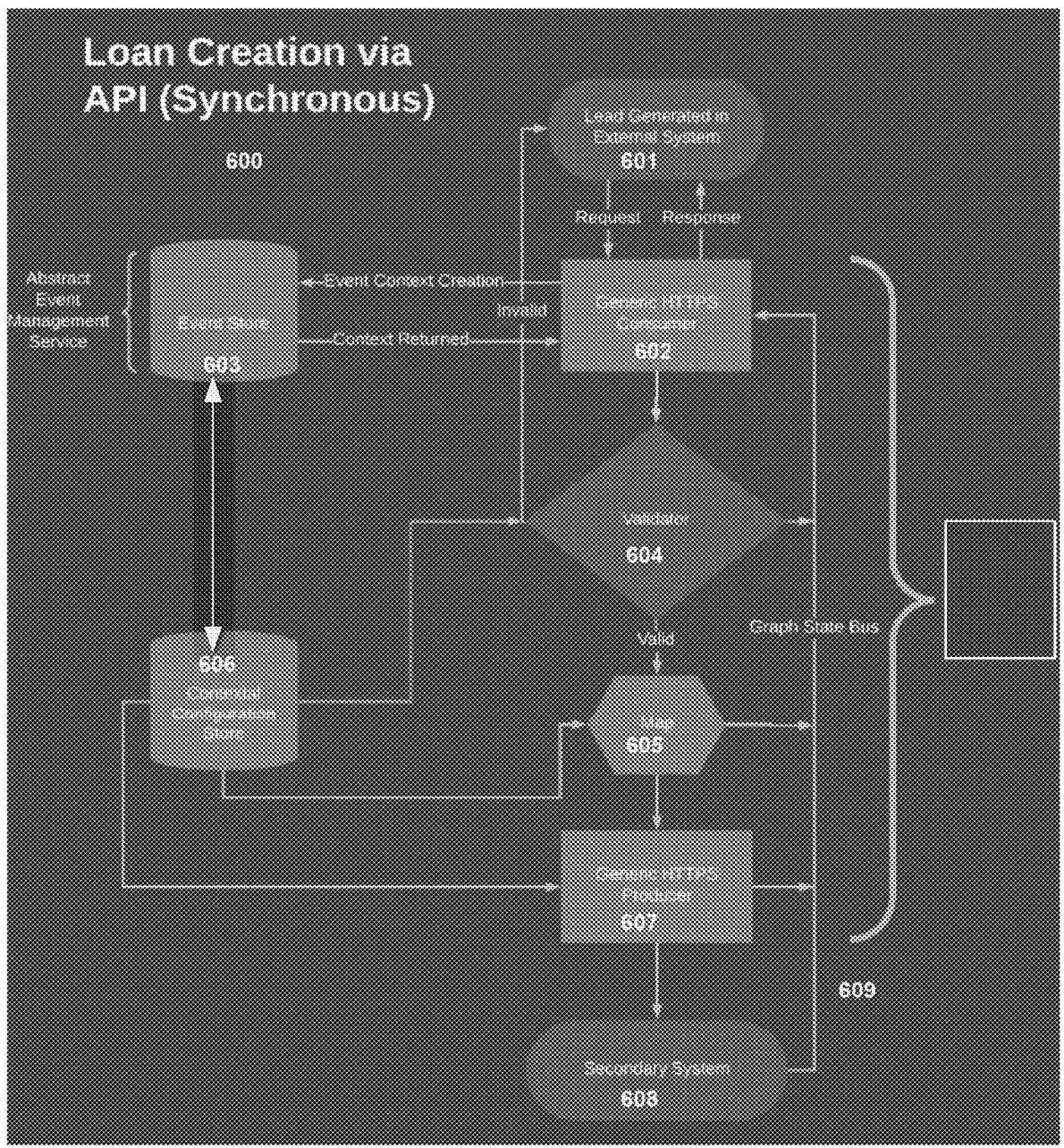
FIG. 6 is an example of a loan creation task graph in an embodiment of the system.
Figure 7:
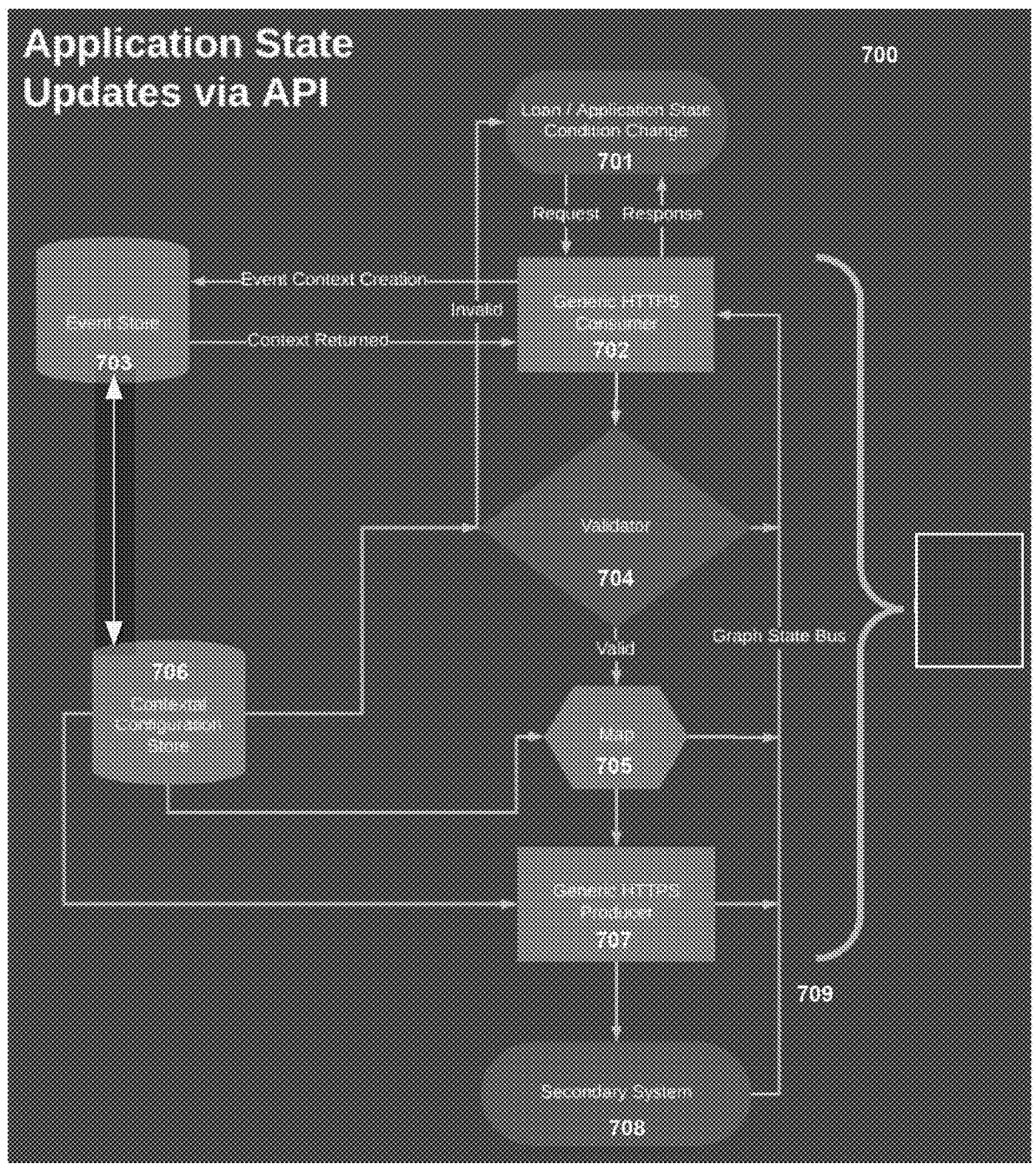
FIG. 7 is an example of an application state update task graph in an embodiment of the system.

FIGS. 6 and 7 illustrate task graphs in an embodiment of the system. One application of the system is in the loan industry, to streamline the application and handling of loans from multiple parties using multiple systems normally requiring multiple APIs.

FIG. 6 is a task graph 600 illustrating loan creation via API in an embodiment of the system. Task 601 is an external process where a lead is generated in an external system. For example, it could be a loan applicant. Task 601 sends requests to, and receives responses from, Generic HTTPS/Consumer primitive 602. Generic HTTPS/Consumer primitive 602 outputs Event Context Creation to Event Store (e.g. Persistence Primitive) 603 The Event Store 603 returns Context to Generic HTTPS/Consumer Primitive 602.

Event context creation flow from Generic HTTPS/Consumer 602 to Event Store 603 causes Event Store to leverage Contextual Configuration Store 606 and to potentially make changes to Contextual Configuration Store 606. In one embodiment, only Event Store 603 can make changes to Contextual Configuration Store 606.

Requests and Events are provided from Generic HTTPS/Consumer 602 to Validator primitive 604, along with contextual data from Contextual Configuration Store 606. The Validator primitive 604 verifies that the input matches requirements. If not, the Validator returns invalid to the External System 601. If valid, Validator 604 sends the data and schema to Map primitive 605. When Validator primitive 604 executes a task, it sends its state on the Graph State Bus 609.

Map primitive 605 receives data from Validator 604 and contextual data from Contextual Configuration Store 606. Map 605 uses the data from Validator 604 and the mapping function from Contextual Configuration Store 606 to produce an output to Generic HTTPS/Producer 607 and updates its state on Graph State Bus 609.

Generic HTTPS/Producer 607 receives contextual information from Contextual Configuration Store 606 and uses it, along with the output from Map 605, to provide output to Secondary System 608. Generic HTTPS/Producer 607 updates its state on Graph State Bus 609. State updates on Graph State Bus 609 are sent to Generic HTTPS/Consumer 602.

In one embodiment, elements 601, 602, 604, 605, and 607 can pass context to Contextual Configuration Store 606 and in return receive any configuration required to execute their function.

FIG. 7 is a task graph showing Application State Updates. This task graph shows an implementation of an in-app experience for borrowers containing up-to-date information about the state of a loan. This process requires transmission of State from external systems to the present system. The system provides translation, normalization, and mapping of multiple external systems to state mapping in the system. It should be noted that this task graph is easily assembled using the core primitives of the system, and shows a commonality with FIG. 6, indicating the high reusability of the primitives of the system.

Task 701 is an external system process that provides Loan/Application State or Condition Changes. The data provided by task 701 could represent different events in the processing of a loan application, such as confirmation of income or employment, receipt of tax returns, request for additional information, predicted funding date, and the like. That task 701 sends requests to, and receives responses from, Generic HTTPS/Consumer primitive 702. Generic HTTPS/Consumer primitive 702 outputs Event Context Creation to Event Store 703 The Event Store 703 returns Context to Generic HTTPS/Consumer Primitive 702.

Requests and Events are provided from Generic HTTPS/Consumer 702 to Validator primitive 704, along with contextual data from Contextual Configuration Store 706. The Validator primitive 704 verifies that the input matches requirements. If not, the Validator returns invalid to the External System 701. If valid, Validator 704 sends the data and schema to Map primitive 705. When Validator primitive 704 executes a task, it sends its state on the Graph State Bus 709.

Event context creation flow from Generic HTTPS/Consumer 702 to Event Store 703 causes Event Store to leverage Contextual Configuration Store 706 and to potentially make changes to Contextual Configuration Store 706. In one embodiment, only Event Store 703 can make changes to Contextual Configuration Store 706.

Map primitive 705 receives data from Validator 704 and contextual data from Contextual Configuration Store 706. Map 705 uses the data from Validator 704 and the mapping function from Contextual Configuration Store 706 to produce an output to Generic HTTPS/Producer 707 and updates its state on Graph State Bus 709.

Generic HTTPS/Producer 707 receives contextual information from Contextual Configuration Store 706 and uses it, along with the output from Map 705, to provide output to Secondary System 708. Generic HTTPS/Producer 707 updates its state on Graph State Bus 709. State updates on Graph State Bus 709 are sent to Generic HTTPS/Consumer 702.

In one embodiment, elements 701, 702, 704, 705, and 707 can pass context to Contextual Configuration Store 706 and in return receive any configuration required to execute their function.

Example Computer System

Figure 5:
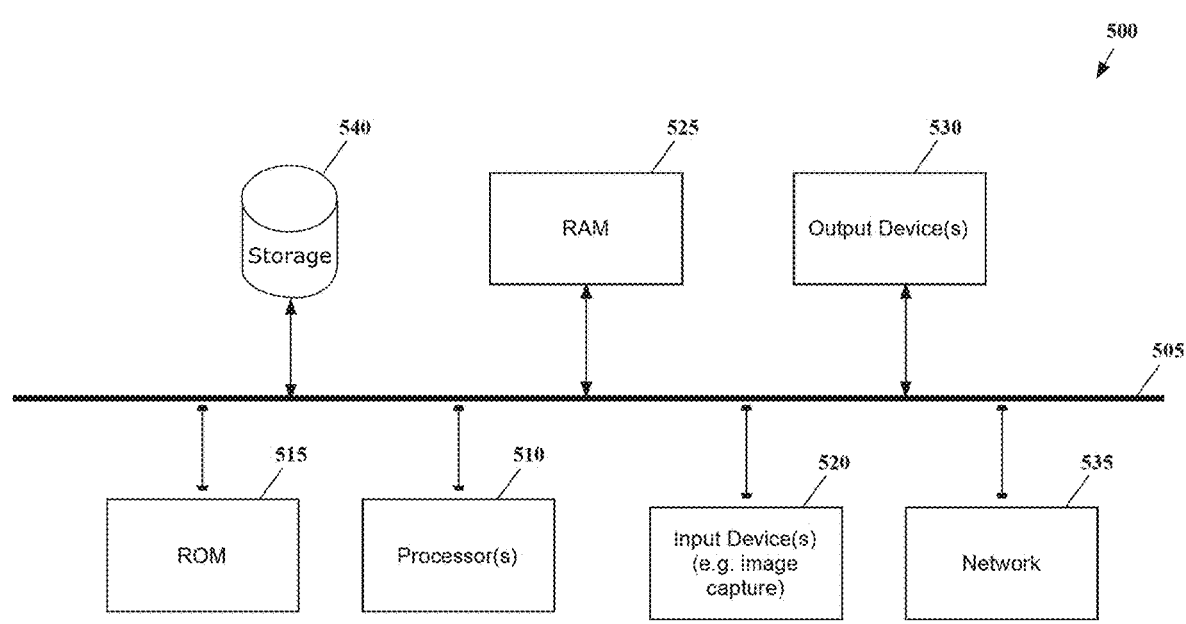
FIG. 5 is an example computer implementation in an embodiment of the system.

FIG. 5 illustrates an exemplary a system 500 that may implement the system. The electronic system 500 of some embodiments may be a mobile apparatus. The electronic system includes various types of machine readable media and interfaces. The electronic system includes a bus 505, processor(s) 510, read only memory (ROM) 515, input device(s) 520, random access memory (RAM) 525, output device(s) 530, a network component 535, and a permanent storage device 540.

The bus 505 communicatively connects the internal devices and/or components of the electronic system. For instance, the bus 505 communicatively connects the processor(s) 510 with the ROM 515, the RAM 525, and the permanent storage 540. The processor(s) 510 retrieve instructions from the memory units to execute processes of the invention.

The processor(s) 510 may be implemented with one or more general-purpose and/or special-purpose processors. Examples include microprocessors, microcontrollers, DSP processors, and other circuitry that can execute software. Alternatively, or in addition to the one or more general-purpose and/or special-purpose processors, the processor may be implemented with dedicated hardware such as, by way of example, one or more FPGAs (Field Programmable Gate Array), PLDs (Programmable Logic Device), controllers, state machines, gated logic, discrete hardware components, quantum computing systems, cloud-based processing systems, distributed processing systems, shared processing systems, or any other suitable circuitry, or any combination of circuits.

Many of the above-described features and applications are implemented as software processes of a computer programming product. The processes are specified as a set of instructions recorded on a machine readable storage medium (also referred to as machine readable medium). When these instructions are executed by one or more of the processor(s) 510, they cause the processor(s) 510 to perform the actions indicated in the instructions.

Furthermore, software shall be construed broadly to mean instructions, data, or any combination thereof, whether referred to as software, firmware, middleware, microcode, hardware description language, or otherwise. The software may be stored or transmitted over as one or more instructions or code on a machine-readable medium. Machine-readable media include both computer storage media and communication media including any medium that facilitates the transfer of a computer program from one place to another. A storage medium may be any available medium that can be accessed by the processor(s) 510. By way of example, and not limitation, such machine-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a processor. Also, any connection is properly termed a machine-readable medium, including, but not limited to, a website, server, or other remote source using a coaxial cable, fiber optic cable, twisted pair, digital subscriber line (DSL), or wireless technologies such as infrared (IR), radio, and microwave. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects machine-readable media may comprise non-transitory machine-readable media (e.g., tangible media). In addition, for other aspects machine-readable media may comprise transitory machine-readable media (e.g., a signal). Combinations of the above should also be included within the scope of machine-readable media.

Also, in some embodiments, multiple software inventions can be implemented as sub-parts of a larger program while remaining distinct software inventions. In some embodiments, multiple software inventions can also be implemented as separate programs. Any combination of separate programs that together implement a software invention described here is within the scope of the invention. In some embodiments, the software programs, when installed to operate on one or more electronic systems 500, define one or more specific machine implementations that execute and perform the operations of the software programs.

The ROM 515 stores static instructions needed by the processor(s) 510 and other components of the electronic system. The ROM may store the instructions necessary for the processor(s) 510 to execute the processes provided by the system. The permanent storage 540 is a non-volatile memory that stores instructions and data when the electronic system 500 is on or off. The permanent storage 540 is a read/write memory device, such as a hard disk or a flash drive. Storage media may be any available media that can be accessed by a computer. By way of example, the ROM could also be EEPROM, CD-ROM or other optical disk storage, magnetic disk storage or other magnetic storage devices, or any other medium that can be used to carry or store desired program code in the form of instructions or data structures and that can be accessed by a computer.

The RAM 525 is a volatile read/write memory. The RAM 525 stores instructions needed by the processor(s) 510 at runtime, the RAM 525 may also store the real-time video or still images acquired by the system. The bus 505 also connects input and output devices 520 and 530. The input devices enable the user to communicate information and select commands to the electronic system. The input devices 520 may be a keypad, image capture apparatus, or a touch screen display capable of receiving touch interactions. The output device(s) 530 display images generated by the electronic system. The output devices may include printers or display devices such as monitors.

The bus 505 also couples the electronic system to a network 535. The electronic system may be part of a local area network (LAN), a wide area network (WAN), the Internet, or an Intranet by using a network interface. The electronic system may also be a mobile apparatus that is connected to a mobile data network supplied by a wireless carrier. Such networks may include 3G, HSPA, EVDO, and/or LTE.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other apparatuses, devices, or processes. Thus, the claims are not intended to be limited to the various aspects of this disclosure but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 15(f) unless the element is expressly recited using the phrase "means for" or, in the case of a method claim, the element is recited using the phrase "step for."

What is claimed is:

1. A method of performing operations comprising:
    identifying data and events required to perform each process of a plurality of processes, wherein an event is a change to the state of an application and is represented as an Event Object;
    using a composition engine for generating a primitive for each process;
    receiving a plurality of asynchronous Inbound Event Objects:
    defining routing of each Inbound Event Object;
    generating an Outbound Event Object by mapping each Inbound Event Object to one or more of the primitives;
    adding each Outbound Event Object to a task graph;
    providing the data to the task graph and performing an operation on the data using the task graph.

2. The method of claim 1 further including the step of adding metadata to each Outbound Event Object to aid in downstream processing.

3. The method of claim 2 further including the step of combining the task graph with one or more other task graphs.

4. The method of claim 2 wherein a primitive comprises one of the group of S/FTP; Encrypt/Decrypt; Generic HTTP/Consumer; Generic HTTP/Producer; Map; Validator, and Persistence.

5. The method of claim 2 wherein the operation to be performed links one system with one system.

6. The method of claim 2 wherein the operation to be performed links one system with many systems.

7. The method of claim 2 wherein the operation to be performed links many systems with many systems.

* * * * *